Argon

CO₂/Ar/O₂

CO₂

United States Patent Office 3,139,506
Patented June 30, 1964

3,139,506
PROTECTIVE GAS MIXTURE FOR LIGHT ARC WELDING WITH A FUSIBLE BLANK WIRE ELECTRODE
Lothar Wolff, Pullach, and Wilhelm Mantel, Munich-Solln, Germany, assignors to Gesellschaft fur Linde's Eismaschinen Aktiengesellschaft, Hollriegelskreuth, near Munich, Germany, a company of Germany
Filed Apr. 14, 1961, Ser. No. 103,021
Claims priority, application Germany Oct. 28, 1958
1 Claim. (Cl. 219—74)

This invention relates to light arc welding, and is concerned with the provision of improved protective gases therefor.

This application contains subject matter originally disclosed in our co-pending application Serial No. 823,346, filed June 29, 1955, now Patent No. 3,035,154 dated May 15, 1962, and is a continuation-in-part of the latter.

As protective gas for light arc welding, noble gases (or mixtures of noble gas and oxygen) or $CO_2$ are mainly used today. However, neither of these kinds of gas, as used until now, always gives a perfect weld. Thus, the light arc with a $CO_2$ atmosphere gives an unusually deep but very narrow weld penetration. Moreover, a light arc free of short circuits cannot be attained by $CO_2$ protection, since the current densities that would be necessary for this lie remarkably high, in the case of 1.6 mm. steel wire, at about 450 A. Such welding current densities are no longer usable since, apparently because of violent reactions of metal vapors with the oxidizing $CO_2$ atmosphere, the light arc is of such a turbulently eruptive form that the process of making a seam weld becomes impossible. Welding under $CO_2$ protection must therefore always be carried out with a light arc beset with short circuits, and, consequently, one that sputters. Account has been taken of this circumstance by welding techniques, shape of nozzle, frequent cleaning of nozzle and a selection of the alloy of the wire. With the high cost of relatively thin welding wires the sputter losses, which may amount to over 10%, affect the economy. These losses and the soiling incidental to sputtering offset to a great extent the savings made possible by the use of cheap protective gas, over processes with light arcs which do not sputter much.

The great penetrating (burning in) power of the $CO_2$ light arc is increased unfavorably by the fact that, in order to cut down on the sputtering of the light arc, a very short arc must be used. The safety of the welding operation suffers thereby, especially when the material is of unfavorable composition or if it has flaws which might make it brittle when hot.

The use of the above mentioned process for quality weldings is thus greatly impeded.

Because of the above recited defects, $CO_2$ welding has won acceptance in industry very slowly, even though a notable welding quality can be attained under $CO_2$ protection, and great efforts have been made all over the world to use the great profit advantage which this process promises.

The special disadvantage of welding under $CO_2$ protection lies, therefore, in the too-narrow and too-deep shape of the weld penetration. On the other hand, welding in argon gives a broad penetration, it is true, but one which does not go deep enough at the edges. A penetration between these two forms would be advantageous to the welding industry. The attempt to produce the arc atmosphere for steel welding from a mixture of argon and carbon dioxide was self-suggesting, but it did not yield the desired result. The relatively great and uniform formation of arc plasma in a pure argon current changes after minor additions of about 3% $CO_2$. The bell form, which is typical of the argon arc, is maintained up to about 15% $CO_2$, but the arc becomes increasingly shorter with increasing voltage and decreasing current intensity. Particularly important is that the welding wire melts off uniformly and in a spray up to a $CO_2$-content of 20%. The arc burning in an Ar—$Co_2$ mixture of more than 20% $CO_2$, on the other hand, has all the characteristics of a carbon dioxide arc. No clear, spray-like material passage can be expected here. As soon as the turning point from the spray passage to the no longer spray-like material passage has been achieved, the quantitative ratio of Ar and $CO_2$ is of minor importance. The plasma of the light arc is thus determined in its nature either by the argon (less than 20% $CO_2$) or by the $CO_2$ (more than 20% $CO_2$).

To illustrate this, the penetration forms for argon and for $CO_2$ are shown in the accompanying drawing, in which.

Figure 1A:
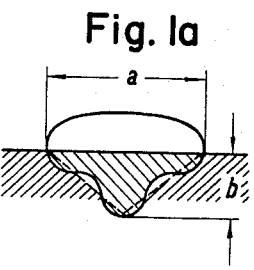
FIG. 1a illustrates the weld penetration when using only argon.
Figure 1C:
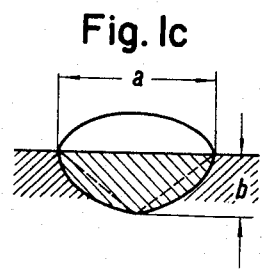
FIG. 1c illustrates the weld penetration effected when using the three-component protective gas mixture of the present invention, and FIG. 2 schematically represents equipment adapted for carrying out the process according to the invention.
Figure 1B:
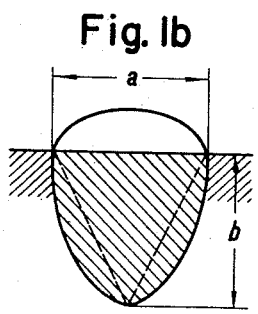
FIG. 1b illustrates the weld penetration when using only carbon dioxide.

In FIGS. 1a, 1b, and 1c the weld penetration is represented by a solid line ovoid. The penetration under protection by argon per se (FIG. 1a) is deep in the center and too shallow at the sides. The penetration contour has a smaller surface than that of the triangle formed of the penetration width "$a$" as a base surface and the penetration depth "$b$" as height, so that flaws in connection at the sides are promoted. The penetration in a $CO_2$ atmosphere (FIG. 1b) is quite generally too narrow and too deep, so that seams result which are apt to crack and also the shape of the penetration can be greatly altered by small form defects of the seam, so that a uniform welding is very difficult.

The problem is, then, to find a protective gas mixture with which a shape of penetration can be attained between that produced with $CO_2$ alone and that produced with argon alone. As already mentioned, this could not be attained with a mixture of argon and $CO_2$. The desired effect only appeared after the addition of oxygen to an argon-$CO_2$ mixture. While the Ar/$CO_2$ ratio, as mentioned above, is only of secondary importance beyond the turning point, a change in the properties of the gas mixture can be achieved to a certain extent by varying the amount of oxygen added. Thus the ratio $a:b$ (see FIG. 1c) rises from an oxygen content of 1% to from 3% to 5%, while the ratio between the surface of the triangle (indicated by broken lines) and of the true penetration surface (right, hatched) drops in the same order. For bright wire welding, especially that of steel, the following composition proved suitable in our experiments: 20–70% by volume $CO_2$, 1–15% by volume $O_2$ and the remainder argon and/or helium. Particularly expedient—especially with regard to the selection of the oxygen concentration—has proved a mixture of 40 to 50% by volume $CO_2$, 5% by volume $O_2$, balance Ar and/or He. By the great width of penetration of such a gas mixture it is insured that hardening will take place from the root (from the bottom), which is important to safety from heat cracks in the welded seam. The penetration contour has a greater surface than the triangle with "$a$" as base and "$b$" as height—as clearly represented in FIG. 1c—and so the penetration at the sides is assured also.

The protective gas mixture according to this invention is taken either from two steel cylinders, one for the argon-oxygen mixture and one for the carbon-dioxide, or from one steel cylinder each for each of the gases to be used, and fed to a common nozzle from which latter all constituents issue together. The distance between the point at which the mixing of the gases takes place and the light arc must be made long enough so that a complete mixing of the individual gas components can take place, which complete mixing is indispensable to a uniformly burning light arc.

The process for light arc welding according to this invention, to be used particularly in the welding of steel, and in which a protective gas mixture of Ar, $O_2$ and $CO_2$ is used, is therefore distinguished by the combination of the following features:

(a) Use of a fusible bright wire electrode;
(b) Feeding of $CO_2$ from a separate container;
(c) Use of a gas mixture of the following composition: 20–70% by vol. $CO_2$, 1–15% by vol. $O_2$, remainder Ar.

Figure 2:
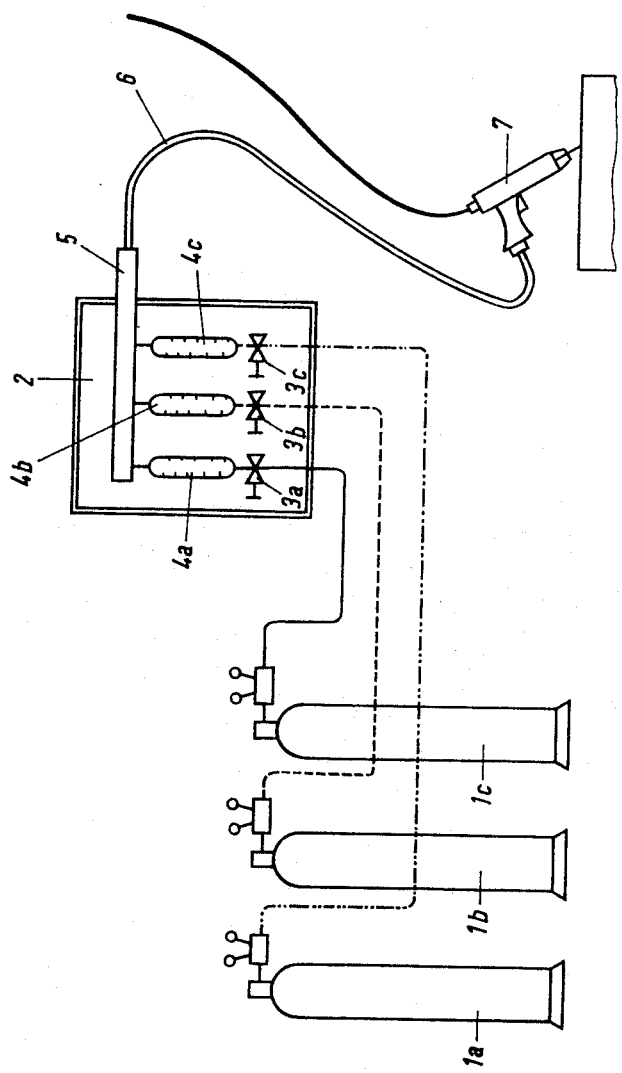

This method is illustrated in FIG. 2. The gases carbon dioxide, oxygen and argon enter from the cylinders 1a, 1b, 1c, into the mixing device 2. The latter is equipped, for example, with three needle valves, 3a, 3b, 3c, and three measuring instruments 4a, 4b, 4c, by means of which the respective amounts of the various gases to be supplied can be regulated. In the course of their passage from the mixing chamber 5 through conduit 6 to the welding torch 7 the various gas constituents become thoroughly mixed with each other.

This process can be modified or supplemented, as the case may be, for its better adaptation to the particular conditions present, in various ways. Thus, by the addition of halogens, especially chlorine, generally known in welding and soldering, a more favorable course in the forming of the seam in steel welding can be attained. In order to insure the stability of the light arc it may be advantageous, also, to add to the protective gas mixture, in an ordinary way, small amounts—perhaps traces—of easily ionized gases, vapors or dusts. Another possibility of variation consists in replacing the $CO_2$ wholly or partially by CO. Finally, instead of argon, another noble gas or noble gas mixture, for example helium or a mixture of helium and argon, may be used.

We claim:

Process for light arc welding, especially steel welding, with the use of a protective gas mixture of Ar, $CO_2$ and $O_2$, characterized by the combination of the following features:

(a) use of a melting bright wire electrode;
(b) use of a gas mixture of the following composition: 20–70% by volume $CO_2$, 1–15% volume $O_2$, remainder Ar.

References Cited in the file of this patent

UNITED STATES PATENTS

| | | |
|---|---|---|
| 2,504,867 | Muller | Apr. 18, 1950 |
| 2,768,278 | Gaines | Oct. 23, 1956 |
| 2,852,659 | Belz et al. | Sept. 16, 1958 |
| 2,863,981 | Thomas et al. | Dec. 9, 1958 |
| 2,907,866 | Yenni | Oct. 6, 1959 |
| 2,932,721 | Kooistra | Apr. 12, 1960 |
| 2,988,627 | Koopman | June 13, 1961 |
| 3,035,154 | Wolff et al. | May 15, 1962 |

FOREIGN PATENTS

| | | |
|---|---|---|
| 791,347 | Great Britain | Feb. 26, 1958 |